Feb. 16, 1926. 1,573,450
C. H. McL. RAYSON
CHILLING APPARATUS
Filed August 10, 1925  3 Sheets-Sheet 1
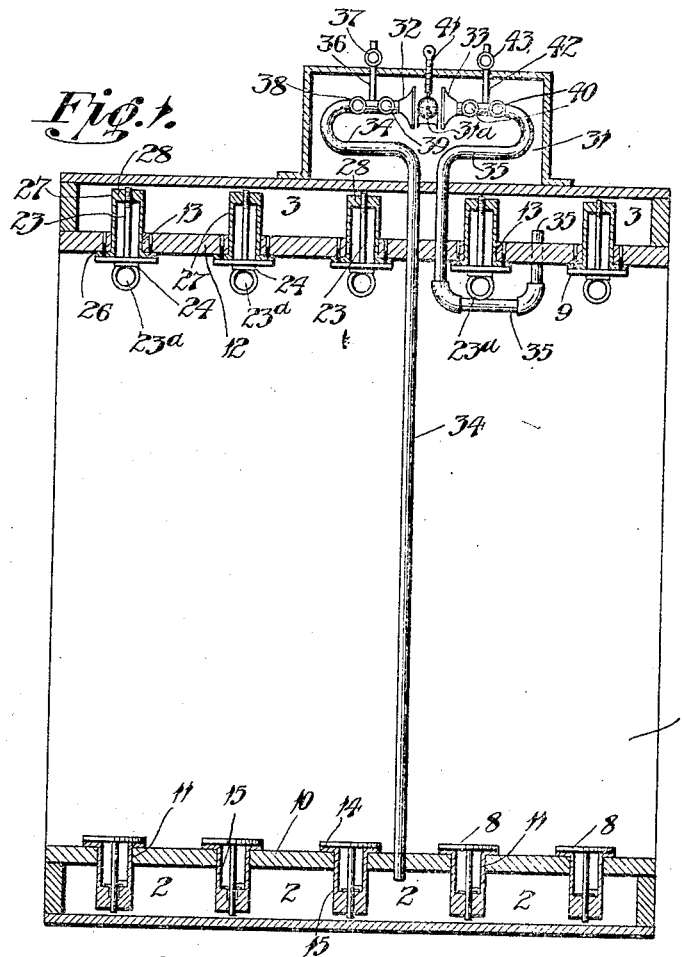
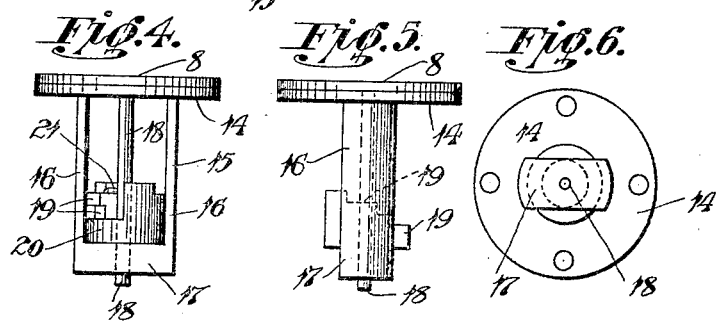
Inventor
C.H.McL.Rayson
by Langner, Parry, Card & Langner
Attys.

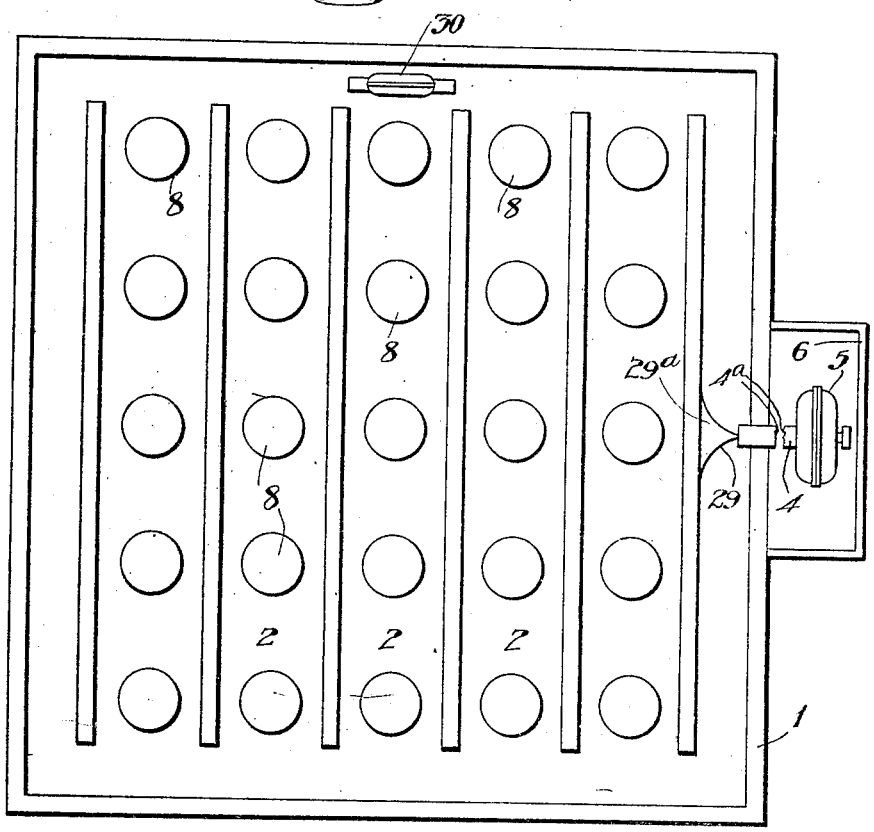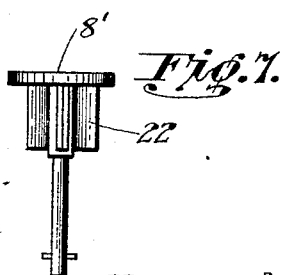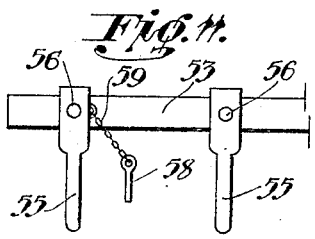

Feb. 16, 1926. 1,573,450
C. H. McL. RAYSON
CHILLING APPARATUS
Filed August 10, 1925   3 Sheets-Sheet 3
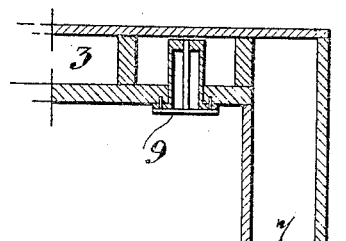
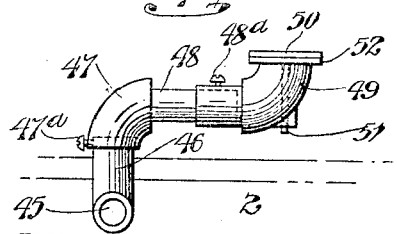
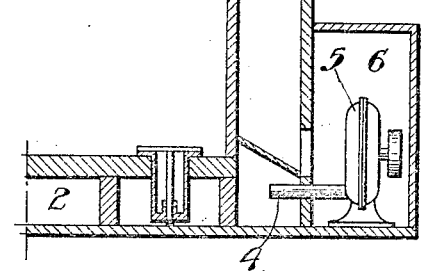
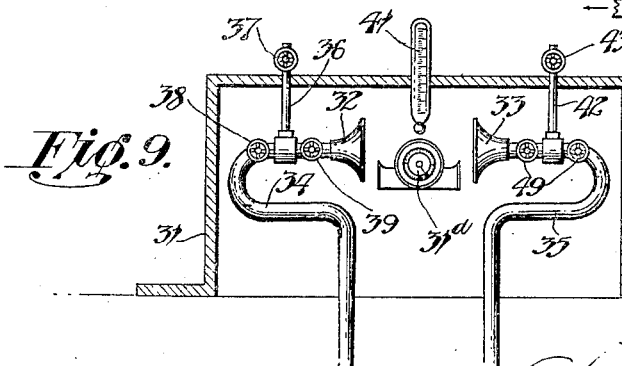

Patented Feb. 16, 1926.

1,573,450

UNITED STATES PATENT OFFICE.

CHARLES HAROLD McLEAY RAYSON, OF ST. KILDA, NEAR MELBOURNE, VICTORIA, AUSTRALIA.

CHILLING APPARATUS.

Application filed August 10, 1925. Serial No. 49,429.

*To all whom it may concern:*

Be it known that CHARLES HAROLD Mc-LEAY RAYSON, citizen of the Commonwealth of Australia, residing at "Surrey," Maryville Street, St. Kilda, near Melbourne, in the State of Victoria, Commonwealth of Australia, has invented certain new and useful Improved Chilling Apparatus (for which I have filed application in Australia, July 28, 1924, No. 18,850), of which the following is a specification.

This invention relates to an improved apparatus for the storage and carriage of beef, mutton and other food products ashore and afloat in a chilled but unfrozen condition at special temperatures and regulated pressures controlled by special apparatus and appliances.

An essential feature embodied in the invention consists in the arrangement and control of the air-flow and in the testing devices employed.

A further essential feature consists in the use of valve plates over the inlet ducts, said plates having spiral webs on the side facing the ducts to impart a rotary swirl to the air as it enters the cooling chamber.

A further essential feature embodied in the invention consists in fitting all the air ducts with adjustable controlling discs or valves so as to ensure the even distribution and circulation of the air over the carcass.

Further essential features are disclosed in the following description of the apparatus.

In order that the invention may be more readily understood reference will now be made to the accompanying drawings in which:—

Figure 1 is a view in vertical central section illustrating the arrangement of the air control valves and the testing mechanism employed.

Figure 2 is a plan view of the storeroom illustrating the floor and the air inlets as well as the air flow or delivery from the fan to the storeroom.

Fig. 2ª is a schematic elevation of a cold battery.

Figure 3 is a part vertical central section taken at right angles to Fig. 1 illustrating the air inlet under pressure from the fan to the floor of the storeroom and the suction outlet from the ducts at the top of the storeroom back to the fan.

Figures 4 and 5 are side elevations at right angles to each other, and Fig. 6 is a plan view, of the air inlet valves at the bottom of the storeroom.

Figures 7 and 7ª are side elevation and plan views, respectively, of an alternative construction of air inlet valve.

Figure 8 is a vertical section, to an enlarged scale, of the air outlet valve on the suction or top side of the storeroom.

Figure 9 is an enlarged sectional view, parts being in elevation, of the testing devices employed.

Figure 10 is a side elevation of a modified air inlet means.

Figure 11 is a view in side elevation of an alternative construction of meat hanging device, and Figure 12 is an end view thereof.

According to this invention a storeroom 1 is provided having air ducts 2 at the bottom or floor and air ducts 3 at the top or ceiling thereof, while a pipe 4 leads from a fan 5 suitably disposed in or adjacent the storeroom in a chamber 6, the pipes 7 from the suction or outlet ducts returning to the fan chamber 6 to allow of the recirculation of the air.

The fan 5 is driven in any suitable way and is so disposed that it forces the air under pressure through the inlet ducts 2 of the storeroom and sucks the air back to its chamber 6 for recirculation from the upper or outlet ducts 3 for recirculation.

The air is forced through a cold battery 4ᵇ interposed in the gap 4ª of the pipe 4 (see Fig. 2ª).

The air is forced into the chamber past inlet valves 8 where it circulates therein and is drawn out past the valves 9 and through the ducts 3 back to the fan casing 6.

Preferably the lower inlet valves 8 are disposed in line with the outlet valves 9 and these valves 8 and 9 will now be particularly described.

The lower ducts 2 are covered by the flooring 10 which is provided with a plurality of circular orifices or holes 11 and these orifices are arranged in a plurality of rows across the flooring 10 of the storeroom.

Similarly the ceiling 12 is formed with a plurality of rows of circular orifices or air holes 13 preferably in line with the holes 11 formed in the flooring 10.

The lower valves 8 consist of a disc of larger diameter than the orifices 11 and rest upon a flange 14 of a bush 15, the flange 14 being screwed to the floor 10. This bush 15 is open on two sides having depending straps 16 with a cross piece 17 at the lower end. From the valve disc 8 depends a stem 18 centrally disposed and entering a hole in the lower cross piece 17, providing a suitable guide to maintain the valve disc 8 in horizontal alignment on adjustment towards and away from the flange 14 of the bush 15. The adjustment is accomplished either by screwing the stem 18 into the cross piece 17 or preferably by forming steps 19 on the portion 20 of the bush 15 which are engaged by a pin 21 on the stem 18, and consequently a greater or lesser opening is given between the orifice 11 and the valve 8 thus controlling the air flow, and by such control an even distribution is made over the carcasses.

In the alternative construction of the lower valve illustrated in Figure 7, the underside of the valve disc 8' may be formed with spiral webs or vanes 22 by means of which a rotary or spiral motion is given to the air as it is delivered past the valves 8' into the storeroom 1.

The webs 22 of each valve are adapted to enter the respective holes 11 in the floor 10, and also form guiding members for the valves.

The upper valves 9 are of disc form and are larger in diameter than the holes 13 in the ceiling 12 leading to the suction ducts 3. Each valve 9 is loosely disposed on a stem 23 and rests on a boss 24 of the eye member 23ª for receiving the hook on which the carcass is suspended. This valve disc 9 is fitted with pins 25 entering holes in the flange 26 of the bush 27, the flange being fastened to the ceiling 12 while the bush enters the hole 13 in said ceiling.

To adjust the valves 9 towards or away from the suction holes 13 of the outlet ducts 3 the end of the stem 23 is threaded into the cross piece 28 of the bush 27 and to maintain the valves in perfect alignment the pins 25 enter holes in the flange 26 of the bush 27 and in the ceiling 12.

In order to assist flow of the air to the ducts 2 and 3 deflecting plates 29, 29ª may be disposed opposite the mouth of the pipe 4.

An auxiliary fan 30 may be disposed in one of the ducts 2 as illustrated in Fig 2, which would serve to pick up the air and give force for it to pass beyond the point where it would naturally be spent and also to allow of a smaller duct to be used thus giving greater cargo space.

Special means are embodied in this invention and form essential features thereof comprising testing devices which dispense with the necessity of entering the chamber while the chilling is being effected and these means consist of a chamber 31 having a thermometer 41 between flared mouths 32, 33 respectively of the pipes 34, 35 of inlet ducts 2 and the suction ducts 3.

A pipe 36 leads from the pipe 34 and externally of the chamber 31 is fitted with a control valve 37 while on both sides of the branch pipe 36 valves 38, 39 are so disposed that when the valve 37 is closed and the valves 38 and 39 are open the air feeds through the pipe 34 to the mouth 32 to the thermometer 41 and the temperature is thus taken of the air in the ducts 2 or the bottom of the storeroom.

An air meter 31ª is disposed adjacent the mouth 32 of the pipe 34 to indicate the air velocity and to indicate that the fan is functioning correctly.

If the valve 38 be opened the valve 39 closed and the valve 37 opened the air can blow off to atmosphere through the pipes 34, 36 should it be desirable to vary or change the air by adding a quantity of fresh air in the circulation and also to allow of a sample of the air to be taken to ascertain the humidity and whether mould or putrification is present.

The valves 37, 38, 39 and all operated externally of the chamber 31.

A pipe 35 leads from the ceiling 12 or the suction ducts 3 to the chamber 31 and terminates in a flared mouth 33 adjacent the thermometer 41, the outlet 33 being controlled by valves 40 operated externally of the chamber 31 while a pipe 42 extends externally of the chamber 31 and is fitted with a valve 43.

Thus on closing the left hand valve 40 and opening the valve 43 fresh air can be drawn into the fan circulation as required, an air filter being disposed to clear the air before it enters the suction inlet pipe 42.

The control means therefore serves many useful purposes while the chilling is being carried out as the temperature is registered, any increase or decrease in the amount of air in circulation is shown, the amount of new air admitted is regulated, and the amount of air discharged is also regulated.

In the modification illustrated in Figure 10 the air ducts 2 consist of pipes 45 having T pieces 46 connecting elbows 47 above the floor line, a length of piping 48 passing from the elbow 47 to an elbow member 49 fitted with a valve 50, the stem 51 of which passes through the elbow 49 which is tapped to receive the threaded end of the stem 51 for adjusting the valve 50 to or from the flange 52 formed on the upper end of the elbow 49, so regulating the air flow.

Where the elbow 47 connects to the T piece 46 by screw 47ª latitude is given thereto to allow of free movement of the valve 50, elbow 49 and pipe connection 48 so that these members may be swung radially from the T piece 46 to permit of the air being delivered to any position according to the radius in which the above described members may swing and thus the air flow can be delivered to various positions as desired.

The piping 48 may be telescopic as illustrated to obtain a greater range of throw, the parts being held by a screw 48ª while the elbow 47 is also held in adjusted position by the screw 47ª.

In the alternative construction of suspending the carcass shown in Figure 11 a meat rail 53 is connected to the eyes 23ª of the upper valve sets 9, a distance washer 54 being positioned between the eyes 23ª and meat rail 53 to permit of hook members 55 being moved thereon.

The hook members 55 are retained in their positions on the meat rail 53 by forming holes 56 therein which are adapted at predetermined intervals to register with holes 57 in the meat rail 53, pins 58 supported by a flexible connection 59 being provided to secure the hook members 55 in position on the meat rail 53 by passing said pins 58 through the holes 56 and 57 in the hook members 55 and meat rail 53 respectively.

In large plants, rails and McCabe rollers may be employed to deliver the meat to the storeroom 1 and the carcasses may then be transferred by their hooks to the eyes 23ª from the rails, and by this arrangement of hooking on to the eyes 23ª an axial motion is given the stem on its thread which allows the hook to roll or pitch with the ship while the carcasses are maintained and separated from each other and the rubbing of the meat is prevented.

In operation air is forced by the fan 5 through the cold battery 4ᵇ and ducts 2 and past the valves 8 which are adjusted to suit the flow.

The air circulates in the storeroom 1 upwardly around the carcasses past the suction valves 9 to the suction ducts 3 and thence back to the fan 6, this operation being continued for any period required, and on testing, air may be discharged and a fresh charge drawn in, in the manner above described, if found necessary.

A process and apparatus as above described will be of great utility for the reason that mould is eliminated and carriage of meat and other products over a long sea voyage can be accomplished and I desire it to be understood that various improvements and modifications may be embodied without departing from the spirit and scope of the invention.

What I claim as my invention and desire to secure by Letters Patent is:—

1. A chilling apparatus, comprising, a closed chamber, means for supporting products in the chamber, air ducts inside the chamber at the top and the bottom thereof, a propeller, air pipes connecting the suction side of the propeller to the top air ducts and the compression side of the propeller to the bottom air ducts, a test box, test pipes leading from the top and the bottom air ducts and having spaced adjacent ends positioned in the box, a thermometer projecting from the box and extending between the test pipe ends, an air meter in the box between the pipe ends, a branch pipe from each test pipe connecting the end of each test pipe to atmosphere, and valve means controllable from outside the test box to control passage through the branch pipes and the test pipes.

2. A chilling apparatus, comprising, a closed chamber, means for supporting products in the chamber, air ducts inside the chamber at the top and the bottom thereof, a propeller, air pipes connecting the suction side of the propeller to the top air ducts and the compression side of the propeller to the bottom air ducts, a text box, pipes connecting the box with the air ducts and means in the box to determine the temperature of air flowing through the ducts and valved pipes to admit air to, and discharge air from, the box, and to regulate the quantity of such air.

3. In a chilling apparatus, a chamber, a false ceiling in the chamber, apertures in the false ceiling, a valve controlling each aperture, each valve comprising a stem, a boss on the stem, a valve disk loose on the stem and supported on the boss, an eye on the stem below the valve disk, a bush passing into the aperture, a screw thread on the inner end of the stem threaded into the bush, a flange on the bush surrounding the orifice and fixed to the false ceiling, matching holes in the flange and ceiling, pins projecting from the valve disk and slidable in the matching holes for maintaining the valve in proper alignment upon screwing the stem into the bush.

4. In a chilling apparatus, a chamber, a false ceiling in the chamber, apertures in the false ceiling, a valve controlling each aperture, each valve comprising a stem, a boss on the stem, a valve disk loose on the stem and supported on the boss, an eye on the stem below the valve disk, a bush passing into the aperture, a screw thread on the inner end of the stem threaded into the bush, a flange on the bush surrounding the orifice and fixed to the false ceiling, matching holes in the flange and ceiling, pins projecting from the valve disk and slidable in the matching holes for maintaining the valve in proper alignment upon screwing the stem into the bush, product supporting means detachably and swingably connectable to the eyes.

5. In a chilling apparatus, a chamber, a false bottom in the chamber, pipe conduits below the false bottom, a plurality of members connecting the conduits with the interior of the chamber each member including, a T connected in the conduit and extending above the false bottom, an elbow, an adjustable disk valve in the elbow, an elbow swivelled to the T, and a pipe telescopically interconnecting the two elbows, whereby the position of the valve relative to the conduit can be adjusted.

6. In a chilling apparatus, a chamber, a false bottom in the chamber, a pipe conduit below the false bottom, pipes connecting the conduits with the chamber above the false bottom, a valve controlling flow through each of the pipes, and a swivel joint between each pipe and the pipe conduit.

7. In a chilling apparatus, a chamber, suction valves in the ceiling of the chamber, depending eyes on the valves, a meat rail spaced from, and fastened to, the valve eyes, hooks slidable along the rail, registrable apertures in the hooks and the rail, and pins flexibly connected to the hooks and insertable in registering apertures in the hooks and rails for fixing the hooks in position on the rail.

In testimony whereof I have signed my name to this specification.

CHARLES HAROLD McLEAY RAYSON.